INVENTOR.
Robert A. McCallum
BY
Murray G. Gleeson
ATTORNEY

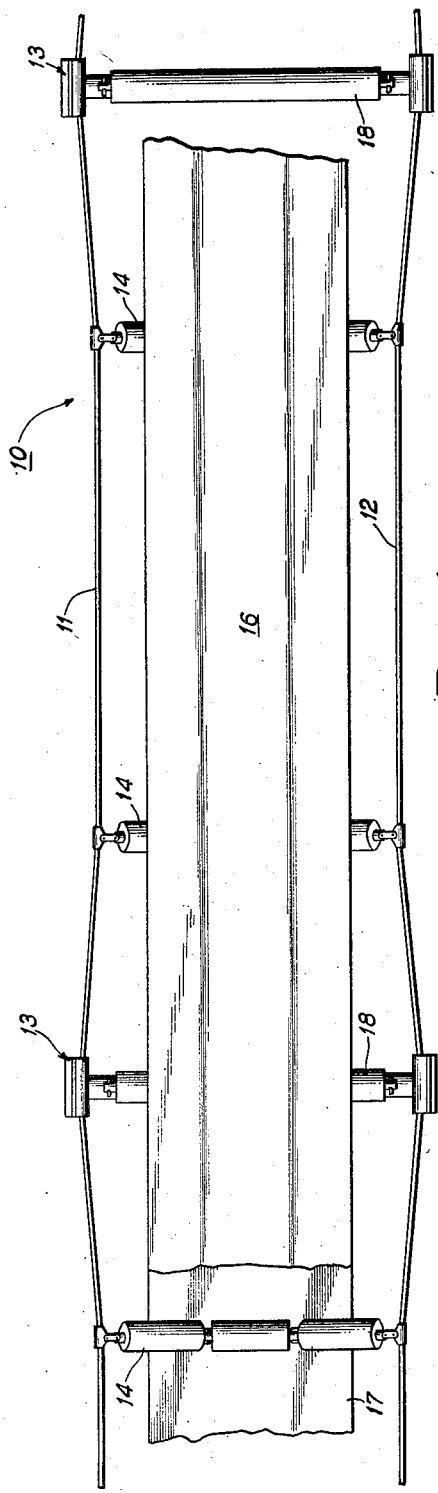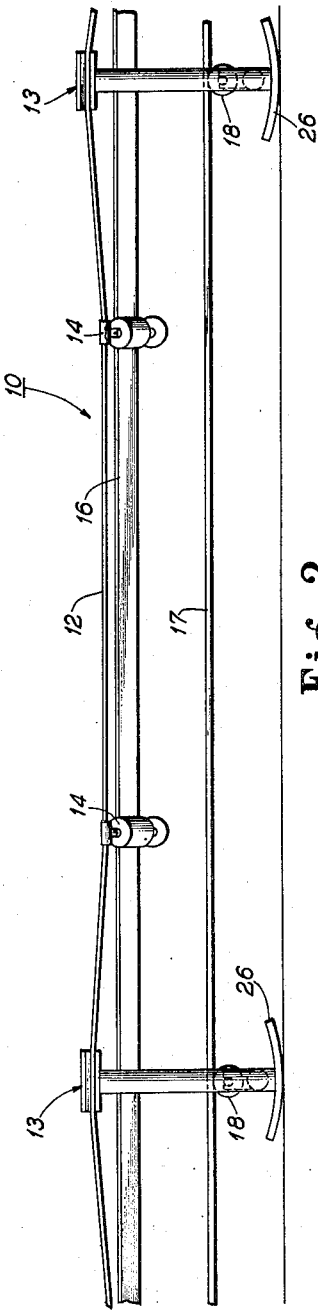

United States Patent Office 2,805,763
Patented Sept. 10, 1957

2,805,763

BELT CONVEYOR SUPPORTED UPON SPACED FLEXIBLE STRANDS

Robert A. McCallum, Clarendon Hills, Ill., assignor to Goodman Manufacturing Company, Chicago, Ill., a corporation of Illinois Application September 30, 1955, Serial No. 537,790

4 Claims. (Cl. 198—192)

This invention relates generally to a belt conveyor of the type which is supported upon spaced flexible strands, and more particularly to improvements in supports for such flexible strands.

In belt conveyors of the type which are supported upon spaced flexible strands the tension in the support strands may cause a stretch therein of the order of several feet in strands of approximately one hundred or more feet in length. Where such strands are employed in belt conveyors of the extensible type, the release of tension on the strands creates some problems at the points where the strands are supported. For example, it is the practice to support the strands at spaced intervals throughout their length and to anchor the strands at such supports. When the tension in the strands is released (when a new length of belt is added) the supports will shift in accordance with the movement of the support strand in contracting to a length corresponding to the condition of released tension thereon.

With the foregoing considerations in mind, it is a principal object of this invention to provide an improved support for the spaced flexible strands of a rope frame conveyor, and to enable the support to shift in accordance with the change in length of the strands as determined by the amount of tension placed thereon.

Other objects and important features of the invention will be apparent from a study of the specification following taken with the drawings which illustrate and describe a preferred embodiment of the invention and what is now considered to be the best mode of practicing the principles thereof. Other embodiments of the invention may be suggested to those having the benefit of the teachings herein, and such other embodiments are intended to be reserved especially as they fall within the scope of the subjoined claims.

In the drawings:

Fig. 1 is a plan view of a portion of a belt conveyor of the type which is supported upon spaced flexible strands, said conveyor having the improvements according to the present invention embodied therein;

Fig. 2 is an elevational view thereof;

Figure 3:
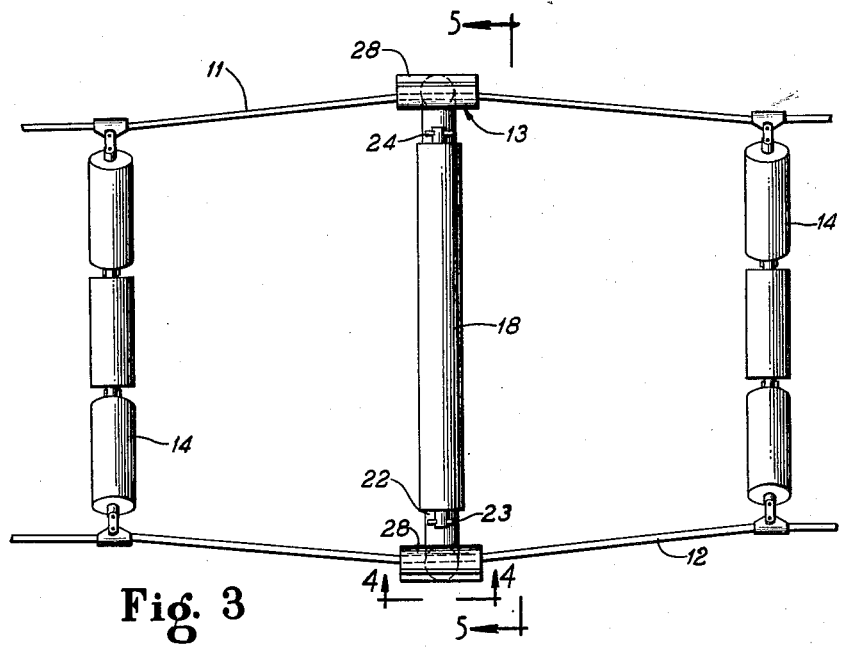
Fig. 3 is a detailed plan view to an enlarged scale of a portion of the conveyor seen in Fig. 1.
Figure 5:
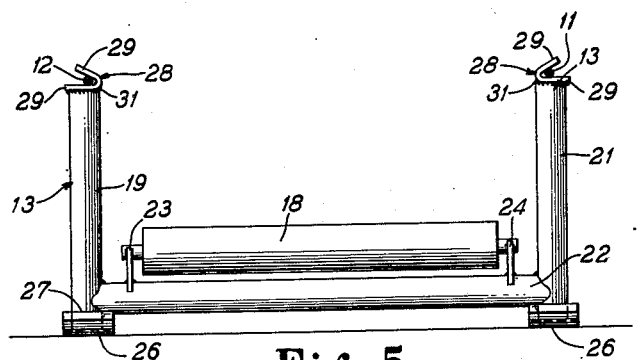
Figure 4:
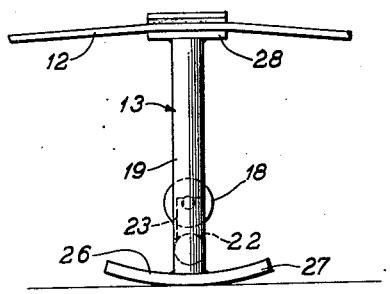

Fig. 4 is an elevational view of one of the support standards of the conveyor seen in Figs. 1 and 3, said view being taken looking in the direction of the arrows 4—4 of Fig. 3; and Fig. 5 is an end view of one of the support standards for the conveyors seen in Figs. 1 and 3, said view being taken looking in the direction of the arrows 5—5 of Fig. 3.

Referring now particularly to Figs. 1 and 2 of the drawings there is shown a belt conveyor indicated generally by the reference numeral 10. Such a belt conveyor is supported upon spaced flexible strands 11 and 12, which in turn are supported at intervals throughout their length upon spaced support standards 13.

Troughing roller assemblies indicated by the reference numeral 14 are supported by the spaced strands 11 and 12 at points intermediate the support standards 13. The troughing roller assemblies 14 are for the purpose of supporting and guiding the the conveying reach 16 of an endless conveyor belt, the return reach 17 of such belt being supported and guided by return idler rollers 18 which are mounted upon the supports 13.

The precise form of the troughing roller assemblies 14 forms no part of the present invention, and any suitable form thereof may be employed to give the proper troughing contour to the conveying reach 16. Such troughing roller assemblies 14 are suspended from the support strands 11 and 12 and the load on the belt 16 transmitted into the troughing roller assemblies 14 imposes a lateral pull on the support strands 11 and 12 to pull them inward as seen in Figs. 1 and 3.

Referring now particularly to Figs. 3, 4 and 5 of the drawings the supports 13 for the spaced flexible strands consist of a pair of laterally spaced uprights 19 and 21 which are joined near the bottom thereof by a spreader 22 which maintains the two uprights 19 and 21 a fixed distance apart. The spreader member 22 has welded thereto a pair of brackets 23 and 24 which provide a support for the return idler roller 18.

Each of the uprights 19 and 21 has welded at the bottom thereof a skid or shoe 26 which is upturned at each end as at 27 so as to enable the skid to move over a mine floor or the like.

Means are provided on each of the uprights 19 and 21 for securing the spaced flexible strands 11 and 12. Such means consist of a generally V-shaped saddle 28 which has one of the arms 29 thereof welded as at 31 to the top of the uprights 19 and 21. The throat of the V-shaped saddle 28 extends outward from the uprights 19 and 21, as seen in Fig. 5 and the convergence of the arms 29 of the saddle 28 is such as to keep the strands 11 and 12 from sliding therein.

As seen in Figs. 1 and 3 the load imposed by the troughing roller assemblies 14 and the conveying reach 16 is such as to force the spaced strands 11 and 12 tightly into the V-shaped saddle 28.

Under certain conditions the tension in the strands 11 and 12 may be released, as for example, when a new length of belt is added to the conveyor. Upon such release in tension the entire support standards 13 are enabled to move on their feet 26 along the mine floor, without being disengaged from the strands 11 and 12, and without tipping. The clamping engagement of each flexible strand in its saddle 28 will be maintained regardless of the tension in such flexible strands. The length of the saddle 28, as seen more particularly in Figs. 3 and 4 is such that there will be little if any pivoting movement of the standard with respect to the flexible strand, the rigidity of the strand being sufficient to prevent such pivoting movement.

It will be seen that the support standards 13 are thus enabled to move with the flexible strands upon the release of the tension therein. As has been explained, such release of tension will reduce the strain in the flexible strands by as much as several feet, and the movement throughout its length of each flexible strand in adopting the condition of no tension therein will enable the standards to move with the support strands without tipping. Obviously, there is no requirement that each standard 13 be staked or anchored to the roof.

While the invention has been described in terms of a preferred embodiment thereof its scope is intended to be limited only by the claims here appended.

I claim as my invention:

1. In a belt conveyor, a pair of laterally spaced flexible support strands, troughing roller assemblies spaced throughout the length of said support strands and suspended therefrom for supporting the conveying reach of an endless belt, a plurality of support standards for said flexible strands spaced at intervals throughout the length thereof, each of said support standards comprising a pair of spaced uprights including a spreader member therebetween, said troughing roller assemblies being supported on said strands at points remote from said standards, an idler roller supported on said uprights for the return reach of said belt, a saddle secured to the top of each upright, said saddle having a generally V-shaped configuration with the throat thereof extending outwardly of said standard, said saddle engaging one of said flexible strands and holding said strand tightly therein, and a foot having a curved ground engaging portion at the bottom of each upright of such a length as to prevent tipping of said standard upon release of tension in said strands when being so gripped in said saddle.

2. In a belt conveyor, a pair of laterally spaced flexible support strands, troughing roller assemblies spaced throughout the length of said support strands and suspended therefrom for supporting the conveying reach of an endless belt, a plurality of support standards for said flexible strands spaced at intervals throughout the length thereof, each of said support standards comprising a pair of spaced uprights including a spreader member therebetween, said troughing roller assemblies being supported on said strands at points remote from said standards, a saddle secured to the top of each upright, said saddle having a generally V-shaped configuration with the throat thereof extending outwardly of said standard, said saddle engaging one of said flexible strands and holding said strand tightly therein, and a foot having a curved ground engaging portion at the bottom of each upright of such a length as to prevent tipping of said standard upon release of tension in said strands when being so gripped in said saddle.

3. In a belt conveyor, a pair of laterally spaced flexible support strands, troughing roller assemblies spaced throughout the length of said support strands and suspended therefrom for supporting the conveying reach of an endless belt, a plurality of support standards for said flexible strands spaced at intervals throughout the length thereof, each of said support standards comprising a pair of spaced uprights, said troughing roller assemblies being supported on said strands at points remote from said standards, a saddle secured to the top of each upright, said saddle having a generally V-shaped configuration with the throat thereof extending outwardly of said standard, said saddle engaging one of said flexible strands and holding said strand tightly therein, and a foot having a curved ground engaging portion at the bottom of each upright of such a length as to prevent tipping of said standard upon release of tension in said strands when being so gripped in said saddle.

4. In a belt conveyor, a pair of laterally spaced flexible support strands, troughing roller assemblies spaced throughout the length of said support strands and suspended therefrom for supporting the conveying reach of an endless belt, a plurality of support standards for said flexible strands spaced at intervals throughout the length thereof, each of said support standards comprising a pair of spaced uprights, said troughing roller assemblies being supported on said strands at points remote from said standards, a saddle secured to the top of each upright, said saddle engaging one of said flexible strands and holding said strand tightly therein, and a foot having a curved ground engaging portion at the bottom of each upright of such a length as to prevent tipping of said standard upon release of tension in said strands when being so gripped in said saddle.

References Cited in the file of this patent

UNITED STATES PATENTS

| 1,748,301 | McKinlay | Feb. 25, 1930 |

FOREIGN PATENTS

| 266,812 | Great Britain | Mar. 3, 1927 |